(No Model.)

C. M. CONRADSON.
TOOL SUPPORT FOR LATHES.

No. 497,769. Patented May 23, 1893.

Witnesses:
James F. Duhamel
Horace A. Dodge

CONRAD M. CONRADSON,
Inventor,
by Dodge Sons,
Attys.

United States Patent Office.

CONRAD M. CONRADSON, OF MADISON, WISCONSIN.

TOOL-SUPPORT FOR LATHES.

SPECIFICATION forming part of Letters Patent No. 497,769, dated May 23, 1893.

Application filed February 23, 1893. Serial No. 463,388. (No model.)

*To all whom it may concern:*

Be it known that I, CONRAD M. CONRADSON, a citizen of the United States, residing at Madison, in the county of Dane and State of Wisconsin, have invented certain new and useful Improvements in Tool-Supports for Lathes, of which the following is a specification.

My invention relates to turret lathes, and consists broadly in means for supporting the tools which are carried by the turret and which are used on long, or heavy work.

Figure 1:
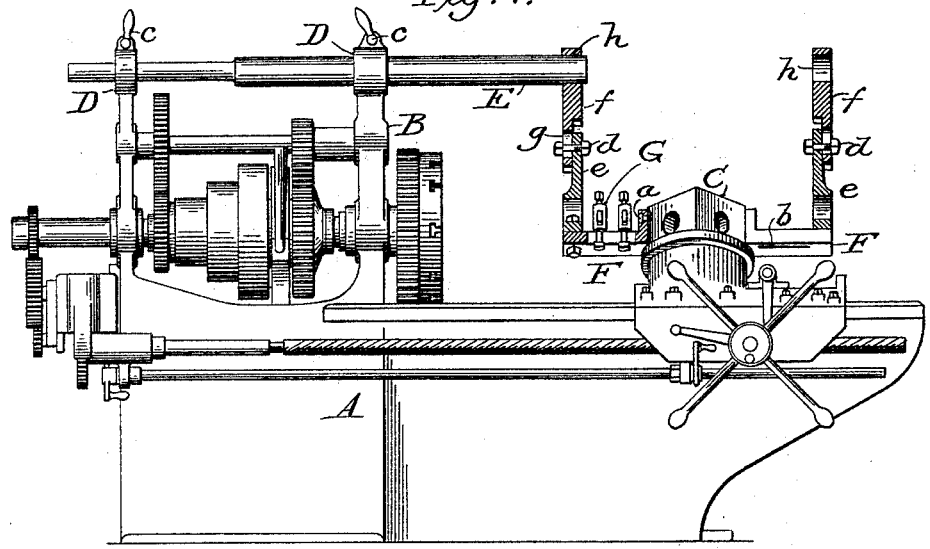
Figure 2:
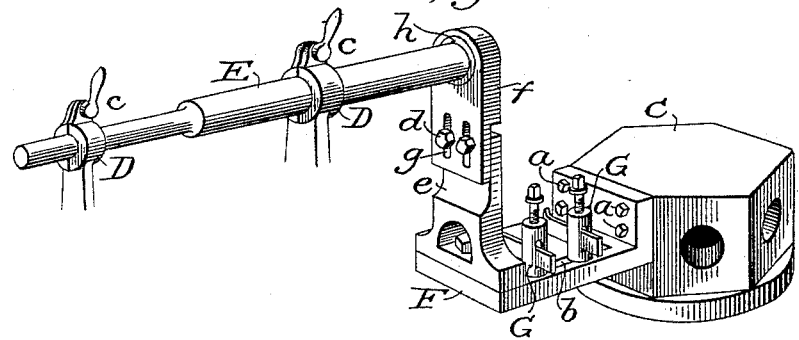

In the drawings,—Figure 1 is a side elevation, partly in section, of a turret lathe showing my improvements applied thereto; and Fig. 2, a perspective view illustrating certain details in construction.

A indicates the main frame of the machine; B the head stock; and C the turret which is carried by the turret slide as is customary in this class of machines.

The head stock is provided at its upper ends with two split boxes D D in which is mounted a longitudinally adjustable bar E which extends in a general direction of travel of the turret.

Secured to each face of the turret is an arm or support F, which is fastened to the turret by means of bolts *a*, or in any other suitable manner. This arm F is slotted longitudinally as at *b* to receive the tool posts G, as clearly shown in Fig. 2. The outer end of each of the arms F is made, preferably, in two sections *e* and *f*, which by means of bolts *d* and suitable holes or slots *g*, are rendered adjustable or extensible in relation to each other. The upper section or member *f* is provided with a hole or opening *h*, which is designed to accurately fit the end of the rod or bar E, as clearly shown in Figs. 1 and 2. From this construction it will be seen that when the turret moves forward, the guiding bushing *f* slides along the rod or bar E and consequently relieves the turret locking mechanism and turret slide of a large part of the strain due to the cutting.

When it is desired to bring into action a new set of turret tools, the turret slide with the turret is moved to the right until the bushing *f* clears or passes off the end of the rod or bar E, when the turret may be swung about its axis to bring another or new arm or support in line with the bar or rod E. The turret is now moved forward slightly until the bushing fits on the end of the rod or bars E, and as soon as this is done the turret may be moved forward further to secure the desired cut. It is essential that the bar or rod E be parallel to the guiding ways of the turret slide. The location of the guiding bar E above the turret is important but not essential. By having the bar above the turret it is out of the way of chips and dirt and brings the bushing up out of the way of the tools. The guiding bar or rod E may be applied to any other part of the main frame, and may be of any shape in cross section.

In lieu of the clamping screws or handles *c*, which are shown applied to the boxes or bearings D, any other suitable form of clamping device may be substituted.

Having thus described my invention, what I claim is—

1. In combination with the main frame, a turret movable thereupon, a supporting bar or rod arranged parallel to the direction of travel of the turret, and a tool support carried by the turret and adapted to engage said bar or rod.

2. In combination with the main frame and the turret adapted to move thereupon, a bar or rod arranged parallel with the direction of travel of the turret, and a series of tool supports secured to the respective faces of the turret and adapted to engage the bar or support.

3. In combination with the main frame and a turret movable thereon; a supporting bar, arranged parallel to the direction of travel of the turret; and a tool support secured to the turret and provided with an adjustable bushing.

4. In combination with the main frame and the turret movable thereon, a tool post support secured to the turret and provided with a bushing $f$, and a bar or rod adjustable lengthwise relatively to the main frame, and adapted to guide or support the tool-post support.

5. In combination with the main frame and the longitudinal bar or rod E, a turret provided with an arm F, said arm being provided at its outer end with a vertically adjustable portion or section $f$ adapted to fit upon the end of the rod or bar E.

In witness whereof I hereunto set my hand in the presence of two witnesses.

CONRAD M. CONRADSON.

Witnesses:
JOHN A. JOHNSON,
W. R. BAGLEY.